US008667927B2

(12) United States Patent
Dupertuis et al.

(10) Patent No.: US 8,667,927 B2
(45) Date of Patent: Mar. 11, 2014

(54) APPARATUS FOR COATING A CYLINDER, IN PARTICULAR A WIPING CYLINDER OF AN INTAGLIO PRINTING PRESS

(75) Inventors: Didier Dupertuis, Goumoens-la-Ville (CH); Andrea Ganini, Mulazzano (IT)

(73) Assignee: KBA-Notasys SA, Lausanne (CH)

( * ) Notice: Subject to any disclaimer, the term of this patent is extended or adjusted under 35 U.S.C. 154(b) by 1418 days.

(21) Appl. No.: 12/065,055

(22) PCT Filed: Sep. 11, 2006

(86) PCT No.: PCT/IB2006/053198
§ 371 (c)(1),
(2), (4) Date: Apr. 22, 2008

(87) PCT Pub. No.: WO2007/031925
PCT Pub. Date: Mar. 22, 2007

(65) Prior Publication Data

US 2008/0245246 A1 Oct. 9, 2008

(30) Foreign Application Priority Data

Sep. 16, 2005 (EP) .................................... 05108565

(51) Int. Cl.

| | |
|---|---|
| ***B05C 3/02*** | (2006.01) |
| ***B05C 1/06*** | (2006.01) |
| ***B31F 1/12*** | (2006.01) |
| ***D21G 3/00*** | (2006.01) |
| *C08F 2/46* | (2006.01) |
| *B05D 1/28* | (2006.01) |

(52) U.S. Cl.
USPC ........... 118/413; 118/409; 118/261; 427/521; 162/111; 162/272; 162/281

(58) Field of Classification Search
USPC ........... 118/409, 261, 413; 101/224; 427/521; 162/111, 272, 281
See application file for complete search history.

(56) References Cited

U.S. PATENT DOCUMENTS 2,893,486 A * 7/1959 Marti ............................ 162/352
3,756,152 A * 9/1973 Abler ......................... 101/350.5

(Continued)

FOREIGN PATENT DOCUMENTS

| | | |
|---|---|---|
| EP | 1 504 898 | 2/2005 |
| GB | 1 116 972 | 6/1968 |

OTHER PUBLICATIONS

International Search Report for PCT/IB2006/053198 dated May 21, 2007.

(Continued)

*Primary Examiner* — Dah-Wei D Yuan
*Assistant Examiner* — Karl Kurple
(74) *Attorney, Agent, or Firm* — Nixon & Vanderhye P.C.

(57) ABSTRACT

There is described an apparatus (1) for coating a cylinder (C), in particular a wiping cylinder of an intaglio printing press, with a plastic composition comprising inter alia a blade mechanism (4) comprising a single substantially planar blade (40) with a straight edge (40*a*) extending along the full length of the cylinder to be coated and which is mounted rotatably about an axis parallel to the axis of rotation of the cylinder to be coated. The blade comprises, at its terminal end proximate to the cylinder, an inclined end portion (4*a*) having an inverted-V shape rising from the upper side of the blade, the top edge of the inclined end portion forming the straight edge of the blade. The blade is adapted to be rotated so that the straight edge of the blade undergoes an upward movement substantially tangential to the periphery of the cylinder in order to discontinue the application of the plastic composition onto the surface of the cylinder.

11 Claims, 6 Drawing Sheets

(56) References Cited

U.S. PATENT DOCUMENTS

| | | | | |
|---|---|---|---|---|
| 3,767,457 | A | 10/1973 | Hubbard et al. | |
| 3,785,286 | A | 1/1974 | Giori | |
| 3,900,595 | A | 8/1975 | Giori | |
| 4,054,685 | A | 10/1977 | Giori | |
| 4,339,472 | A * | 7/1982 | Tachibana et al. | 427/504 |
| 4,542,693 | A * | 9/1985 | Mourrellone | 101/350.4 |
| 4,702,946 | A | 10/1987 | Howland | |
| 5,010,659 | A | 4/1991 | Treleven | |
| 5,131,754 | A * | 7/1992 | Hasegawa | 356/614 |
| 5,180,612 | A * | 1/1993 | Rendell | 427/372.2 |
| 5,437,227 | A * | 8/1995 | Straubinger | 101/169 |
| 5,584,243 | A * | 12/1996 | Kern | 101/479 |
| 5,674,361 | A * | 10/1997 | Marinack | 162/111 |
| 6,155,166 | A * | 12/2000 | Bertagna et al. | 101/153 |
| 6,491,754 | B1 * | 12/2002 | Graf et al. | 118/123 |
| 6,513,514 | B1 * | 2/2003 | Micheletti | 125/21 |
| 6,581,516 | B1 * | 6/2003 | Schonberger | 101/154 |
| 6,866,715 | B1 * | 3/2005 | Ruschak et al. | 118/211 |
| 6,877,247 | B1 | 4/2005 | DeMoore | |
| 2002/0040774 | A1 * | 4/2002 | Dennis, Jr. | 162/281 |
| 2006/0180291 | A1 * | 8/2006 | Rata | 162/281 |

OTHER PUBLICATIONS

Written Opinion of the International Searching Authority dated May 21, 2007.

Office Action mailed Jul. 21, 2010 in U.S. Appl. No. 12/066,112.

International Search Report for PCT/IB2006/053231 dated Mar. 30, 2007.

International Search Report for PCT/IB2006/053201 mailed May 21, 2007.

Written Opinion for PCT/IB2006/053201 mailed May 21, 2007.

* cited by examiner

APPARATUS FOR COATING A CYLINDER, IN PARTICULAR A WIPING CYLINDER OF AN INTAGLIO PRINTING PRESS

This application is the U.S. national phase of International Application No. PCT/IB2006/053198, filed 11 Sep. 2006, which designated the U.S. and claims priority to EP 05108565.2, filed 16 Sep. 2005, the entire contents of each of which are hereby incorporated by reference.

TECHNICAL FIELD

The present invention generally relates to an apparatus for coating a cylinder, (particularly but not exclusively a wiping cylinder of an intaglio printing press) with a plastic composition.

BACKGROUND OF THE INVENTION

In intaglio printing presses, it is commonly known to use a wiping cylinder contacting the plate cylinder carrying the intaglio printing plate or plates as a wiping device for wiping and cleaning the surface of the intaglio printing plate or plates. The purpose of such a wiping cylinder is to simultaneously press the ink deposited onto the printing plates into the engravings and clean the excess ink from the plenum of the printing plates, i.e. the unengraved area of the printing plates outside the engravings.

In order to achieve good printing quality, the wiping cylinder is commonly designed in such a way that its outer surface contacting the printing plates is both physically and chemically resistant, i.e. is adapted to sustain the high contact pressure and friction with the printing plates and can withstand the physical and chemical contact with the ink components and pigments, as well as with the cleaning solutions which are used to clean the surface of the wiping cylinder.

It has already been proposed to provide such a wiping cylinder with an outer layer of resilient synthetic composition, namely a heat-hardenable plastic composition such as PVC. U.S. Pat. No. 3,785,286, U.S. Pat. No. 3,900,595 and U.S. Pat. No. 4,054,685 for instance disclose methods for making such wiping cylinders as well as apparatuses for implementing the said methods. These publications are incorporated by reference in the present application, especially in respect to the material used for forming such cylinders and to the machines and methods used for building such wiping cylinders. Referring for instance to the coating apparatus described in U.S. Pat. No. 4,054,685, means are provided for horizontally mounting a cylinder to be coated for rotation about its axis of rotation. Coating is performed by rotating the cylinder past a straight-edged scraper blade mechanism disposed at one side of the cylinder and which extends parallel to the cylinder axis, this blade mechanism being adapted to be moved towards and away from the cylinder. The blade mechanism consists of two blades mechanically coupled to each other, namely a lower blade and an upper blade which are jointly designed to ensure a proper supply of heat-hardenable plastic material to the surface of the cylinder to be coated and allow adjustment of the thickness of the material to be deposited. The blade mechanism is adapted to be moved towards and away from the cylinder while maintaining the straight edge of the lower blade (i.e. the edge which extends along the length of the cylinder) parallel to the axis of rotation of the cylinder. The plastic material is supplied to the blade mechanism on top of the upper blade which is disposed, during coating of the cylinder, in an inclined relationship with respect to the cylinder so as to form a reservoir between the upper side of the upper blade and the periphery of the cylinder to be coated. Means are provided for restraining flow of the plastic material sideways from the reservoir. The blade mechanism can be translated towards and away from the cylinder in order to maintain a desired uniform spacing (a couple of millimeters or less) between the straight edge of the lower blade and the periphery of the cylinder along the full length of the cylinder. The cylinder is rotated in a direction to cause its periphery to move downwardly past the blade mechanism to thereby apply to the periphery of the cylinder a thin uniform layer of plastic composition having a thickness determined by the spacing between the straight edge of the lower blade and the periphery of the cylinder. This layer of plastic material is heat-cured by applying radiant heat to the cylinder throughout its length as the cylinder is rotated so as to cause hardening of the deposited layer of plastic material and produce a hardened layer of the desired hardness. Several layers with different hardnesses and thicknesses are preferably formed in this way onto the cylinder surface.

According to the solutions described in U.S. Pat. No. 4,054,685, supply of the plastic material to the surface of the cylinder is either interrupted by removing the upper blade of the blade mechanism or by retracting the upper blade away from the cylinder, the upper blade sliding on top of the lower blade.

U.S. Pat. No. 5,180,612 discloses another type of apparatus for coating a wiping cylinder with a layer of plastic material which, in contrast to the previous apparatuses, makes use of a twin-roller coating unit for the application of the plastic material onto the surface of the cylinder. Such a solution has a number of disadvantages including in particular the higher complexity of the coating unit as well as it greater size which affects the ability of the operator to efficiently monitor the coating process and take corrective measures during the coating process. Further, this solution requires an additional cooling unit to regulate the temperature of the rotating coating rollers and prevent undesired hardening of the plastic composition before it reaches the surface of the cylinder. Lastly, cleaning of the coating unit at the end of the coating process is made much more complicated due to the inherently complex nature of the coating unit with its two rotating rollers.

SUMMARY OF THE INVENTION

An aim of the invention is to improve the known devices and methods.

It is an aim of the present invention to provide an apparatus for coating a cylinder with a plastic composition of the type comprising a scraper blade mechanism for applying the plastic composition which is of simpler construction that the known apparatuses.

Another aim of the present invention is to provide a coating apparatus which allows simplification of the required coating operations and enables the operator to focus to a greater extent on the coating process itself, rather than on the operation of the coating apparatus.

Still another aim of the present invention is to provide a coating apparatus allowing the manufacture of cylinders exhibiting an increased coating quality.

These aims are achieved thanks to the apparatus and the blade mechanism defined in the claims.

According to the invention, the blade mechanism used to apply the plastic composition includes a single substantially planar blade mounted rotatably about an axis parallel to the axis of rotation of the cylinder to be coated. This blade comprises, at its terminal end proximate to the cylinder, an inclined end portion having an inverted-V shape rising from the upper side of the blade, the top edge of the inclined end portion forming the straight edge of the blade which extends along the full length of the cylinder and which is used to apply the appropriate layer of coating material.

During coating of the cylinder, the blade is disposed in an inclined relationship with respect to the cylinder so as to from a reservoir between the upper side of the blade and the periphery of the cylinder for receiving the supply of heat-hardenable plastic composition in a similar way as the upper blade of the prior art solutions. In contrast to the prior art solutions, discontinuation of the application of the plastic composition to the periphery of the cylinder is performed by rotating the blade so that the straight edge of the blade undergoes an upward movement tangential to the periphery of the cylinder.

In other words, according to the invention, the proposed single-blade mechanism with its specifically designed blade profile achieves the same function as that of the two-blade mechanism of the prior art, this however at the cost of a simpler construction and easier manipulations.

The result is a greater ability for the operator to focus on the coating process itself because the proposed single-blade mechanism necessitates fewer manipulations in order to be operated. This further leads to a better control of the evolution of the coating process and, as a consequence, an increased coating quality of the cylinders.

Advantageous embodiments of the invention are the subject-matter of the dependent claims.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

EMBODIMENTS OF THE INVENTION

Figure 1:
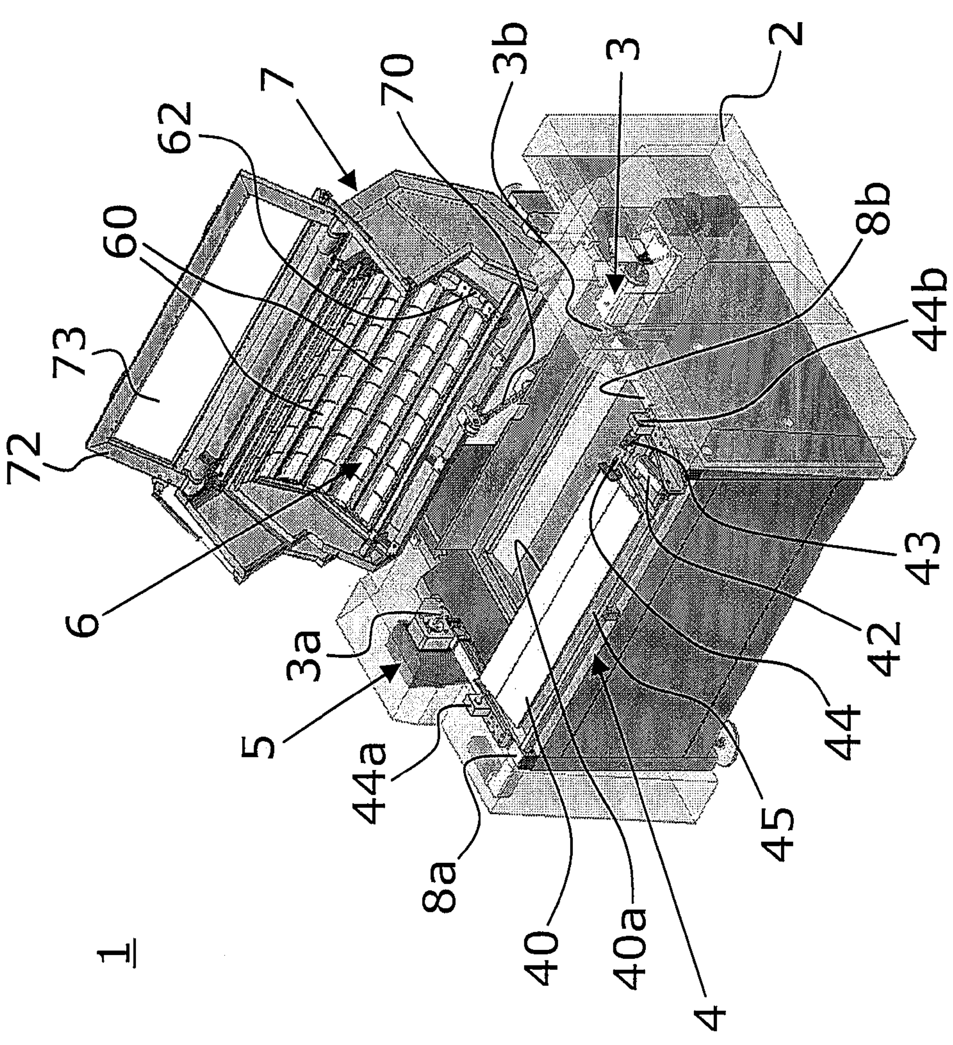
FIG. 1 is a perspective view of an embodiment of the coating apparatus showing the blade mechanism in a rest position.

FIG. 1 shows a perspective view of an embodiment of a coating apparatus according to the invention, designated globally by reference numeral 1. The coating apparatus 1 comprises a main machine body 2 which supports means 3 for horizontally mounting a cylinder to be coated (cylinder not shown) for rotation about its axis of rotation, a blade mechanism 4 with a single blade 40 disposed at one side of the cylinder for the application of the heat-hardenable plastic composition (the blade mechanism 4 is shown in FIG. 1 in a rest position which is pulled back away from the cylinder mounting location), driving means 5 (e.g. an electric motor or the like) for rotating the cylinder in a direction to cause its periphery to move downwardly past the blade mechanism 4, and heating means 6 for applying radiant heat to the cylinder throughout its length as the cylinder is rotated to cause hardening of the deposited layer of plastic composition.

Not shown is the centralized computer interface, known per se in the art, that is coupled to the functional parts of the machine and enables the operator to operate and interact with the machine. This computer interface preferably included a touch screen mounted on a pivotable supporting arm coupled at the frontal side of the machine body 2 (preferably on the right-hand corner of the frontal side of the machine 2) so that the operator can adjust and monitor the various parameters of the machine while facing the cylinder from the frontal part of the machine.

In this embodiment, the heating means 6 are located in a movable hood part 7 which can be pivoted onto or away from the cylinder location by an actuation mechanism 70 (such as a pneumatically-actuated arm coupled at one extremity to the main machine body 2 and at the other extremity to the hood part 7). The hood part 7 is advantageously provided with a window panel 72 comprising a transparent heat-resistant glass window 73. In this example, the window panel 72 is mounted rotatably at its upper part onto the hood part 7, the window panel 72 being shown in an open position in FIG. 1. This window panel 72 enables the operator to have a clear view of the cylinder surface during both coating and heating of the cylinder when the hood part 7 is in its closed position.

The heating means 6 include a plurality of individual heating elements 60 (preferably ceramic heating elements) mounted on a curved supporting frame 62 located inside the hood part 7. In this illustrative example, the heating elements 60 are arranged so as to form an array of eight columns of six heating elements each that are mounted on the curved supporting frame 62 so as to follow the curvature of the cylinder to be coated and extend along the full length of the cylinder.

Aspiration means, not shown in detail but known per se in the art, are further provided in the hood part 7 so as to suitably aspirate the fumes that are generated during the coating and heating processes. These fumes are preferably evacuated to a condensation and/or filter unit (not shown) before disposal.

The means 3 for horizontally mounting the cylinder to be coated for rotation about its axis of rotation include a pair of bearings 3*a*, 3*b* that resemble the head-stock and tail-stock, respectively, of a lathe. The head-stock 3*a* holds a revolving spindle driven by the driving means 5 for coupling with one extremity of the cylinder to be coated and for driving the cylinder into rotation. The tail-stock 3*b* can be moved axially along the axis of rotation of the cylinder to be coated to be secured to the other extremity of the cylinder and to accommodate different lengths of cylinder. If necessary, shaft extensions can be secured to one or both of the head-stock 3*a* and tail-stock 3*b* in order to mount short cylinders.

As mentioned hereinabove, the blade mechanism 4 is shown in FIG. 1 in a rest position (or cleaning position). The single blade 40 is mounted on the blade mechanism 4 so as to be able to rotate about a rotation axis which is substantially parallel to the axis of rotation of the cylinder to be coated. More precisely, in the rest position, the blade 40 is rotated in such a manner that waste material from the coating process can be cleaned away from the blade into a collecting receptacle 45 disposed underneath the blade 40 (in this example the blade 40 is rotated in such a way that its upper side is oriented towards an operator which would face the frontal part of the machine). This collecting receptacle 45 is preferably secured to the blade mechanism 4 so as to follow its movement toward and away from the cylinder to be coated. The collecting receptacle could alternatively be fixedly secured to the machine body 2.

The blade mechanism 4 is adapted to be moved towards and away from the cylinder to be coated. To this end, the blade mechanism 4 is coupled to translation means comprising a pair of guide members 8*a*, 8*b* located on each side of the blade mechanism 4. Translation of the blade mechanism 4 onto the guide members 8*a*, 8*b* is induced by suitable driving means, preferably electrical motors. The translation means ensure appropriate displacement of the blade mechanism 4 between the cleaning position, shown in FIG. 1, and the operating position (or coating position), shown in FIG. 2, as well as micrometric retraction of the blade mechanism 4 away from the surface of the cylinder during the coating operation.

Figure 2:
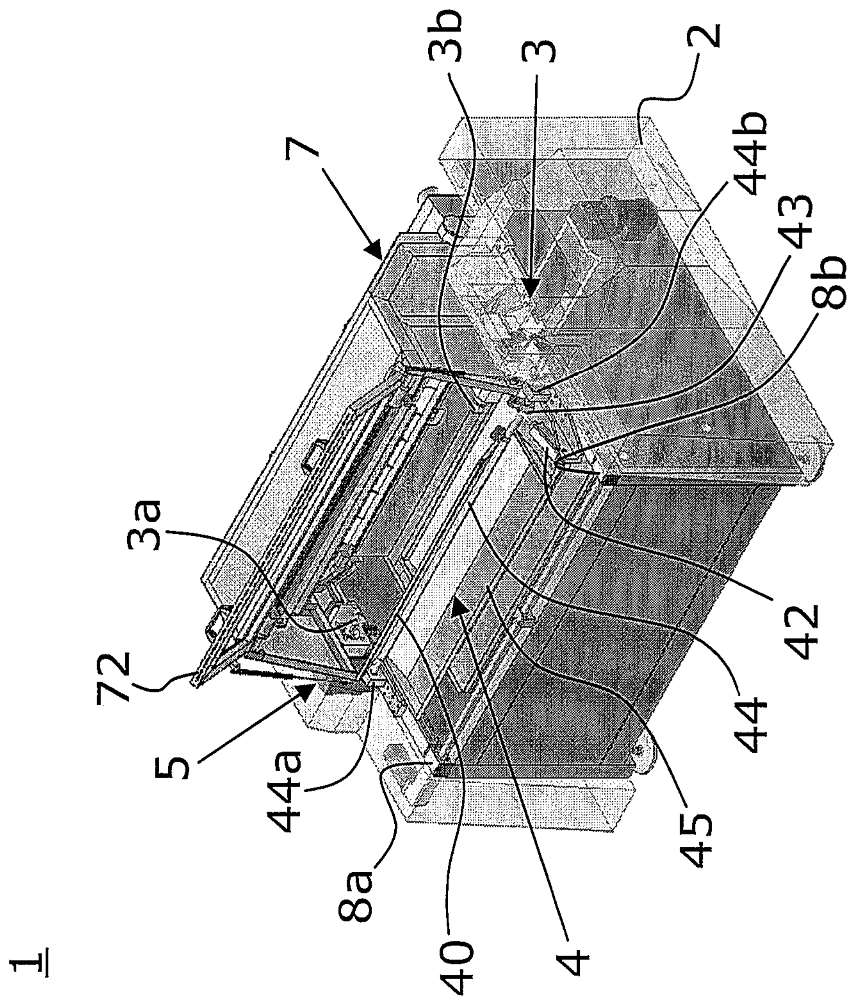
FIG. 2 is a perspective view of the coating apparatus of FIG. 1 showing the blade mechanism in the coating position.

FIG. 2 is a perspective view of the embodiment of FIG. 1 showing the hood part 7 in its closed position (the window panel 72 being still shown in an open state) and the blade mechanism 4 in its coating position. FIG. 2 also shows the tail-stock 3*b* moved axially towards the head-stock 3*a* as this would be the case after having mounted a cylinder to be coated between the head-stock 3*a* and tail-stock 3*b* (no cylinder being again shown in FIG. 2 for the purpose of simplification).

FIG. 2 further shows that the blade 40 of the blade mechanism 4 is rotated towards the cylinder to be coated, the straight edge 40*a* of the blade 40 (see FIG. 1) being directed towards the periphery of the cylinder. More precisely, the blade 40 is disposed, during coating of the cylinder, in an inclined relationship with respect to the cylinder so as to form a reservoir between the upper side of the blade 40 and the periphery of the cylinder for receiving a supply of heat-hardenable plastic composition.

Rotation of the blade 40 between the cleaning position shown in FIG. 1 and the coating position shown in FIG. 2 is advantageously performed by means of an actuator 42 (such as a pneumatic piston) actuating a rotating arm 43 coupled to the underside of the blade 40 via a shaft member 44 (the shaft member 44 being mounted between two bearings 44*a*, 44*b* supported at each side of the blade mechanism 4 on the guide members 8*a*, 8*b*). As this will become apparent from the following, the means 42, 43, 44 for causing rotation of the blade 40 form means for discontinuing the application of the plastic composition at the end of the coating process.

Figure 3:
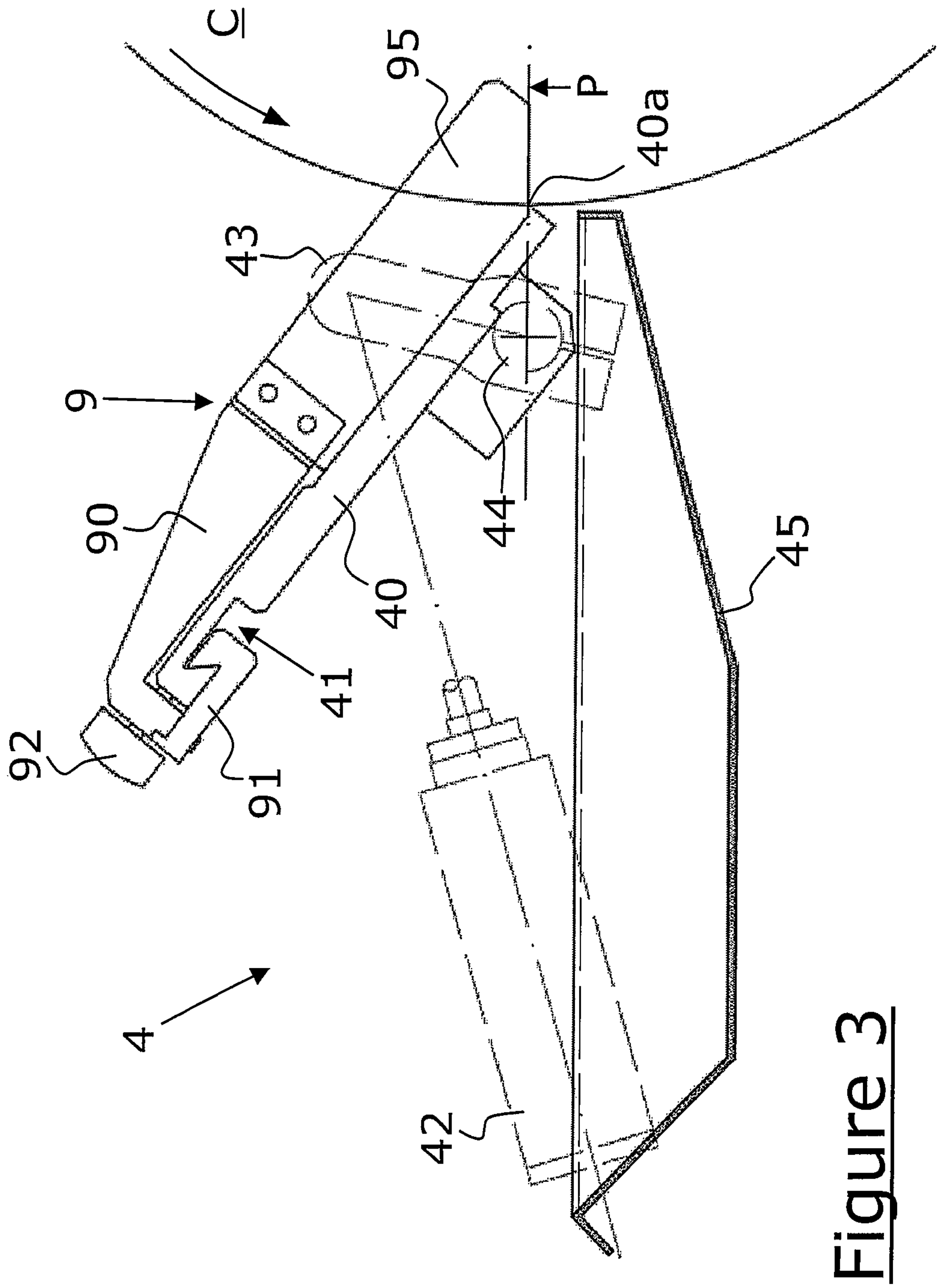
FIG. 3 is a side view of the blade mechanism taken perpendicularly to the axis of rotation of the cylinder to be coated showing the blade mechanism in the coating position.

FIG. 3 is a side view of the blade mechanism 4 taken perpendicularly to the axis of rotation of the cylinder to be coated which is designated by reference C in this Figure. As illustrated schematically by the arrow, the cylinder C rotates during the coating operation so that the periphery of the cylinder C moves downwardly past the blade mechanism 4 (in a counter-clockwise direction in FIG. 3). The blade mechanism 4 is illustrated in FIG. 3 in its coating position, with the blade 40 oriented in such a manner that the upper side of the blade 40 forms an acute angle with respect to the periphery of the cylinder C. In the coating position, the straight edge 40*a* of the blade 40 is oriented towards the periphery of the cylinder C, the blade mechanism 4 being pushed forward so that the spacing between the straight edge 40*a* and the periphery of the cylinder C amounts to a couple of millimeters or less. This spacing determines the thickness of the layer of plastic composition to be applied onto the surface of the cylinder C.

The plastic composition to be applied onto the cylinder surface is supplied in the reservoir formed between the upper side of the blade 40 and the periphery of the cylinder C. Means 9 for restraining the flow of plastic composition sideways from the reservoir are further provided. These means 9 preferably include a pair of cheek members 90 mounted on the upper side of the blade 40 and each comprising a sidewall member 95 directed perpendicularly to the axis of rotation of the cylinder C for contacting each end thereof. The cheek members 90 are preferably mounted on the blade 40 so as to slide along a direction parallel to the axis of rotation of the cylinder and be adapted to the actual length of the cylinder C. To this end, each cheek member 90 comprises an end piece 91 which is guided into a longitudinal dove-tailed groove 41 provided on the underside of the blade 40 and which extends parallel to the straight edge 40*a* of the blade 40. Each cheek member 90 is further provided with a locking member 92 (such as a screw member or any similar locking means) for locking the cheek member 9 in place once the adequate position on the blade 40 is found.

In FIG. 3, the means 42, 43, 44 for rotating the blade 40 are schematically illustrated in dashed lines. As already mentioned hereinabove, rotation of the blade 40 is undertaken by means of the piston 42 which actuates the rotating arm 43 coupled to the underside of the blade 40 via the shaft member 44.

The coating process occurs with the blade 40 oriented as shown in FIG. 3, the heat-hardenable plastic composition being supplied on the upper side of the blade 40 so as to be brought into contact with the periphery of the cylinder. While the cylinder C is rotated so as to apply the plastic composition on the whole circumference of the cylinder, the blade mechanism 4 is gradually retracted so as to maintain a desired small uniform spacing between the straight edge 40*a* of the blade 40 and the periphery of the cylinder C along the full length of the cylinder. During coating, the operator has the ability to adjust the rotation speed of the cylinder C as well as the retraction speed of the blade mechanism 4 away from the cylinder C. Once the desired coating thickness is reached, the blade 40 is rotated so at to cause the straight edge 40*a* of the blade to follow an upward movement, tangential to the periphery of the cylinder C (in a counter-clockwise direction in FIG. 3) so as to discontinue the application of the plastic composition onto the surface of the cylinder C.

Figure 4:
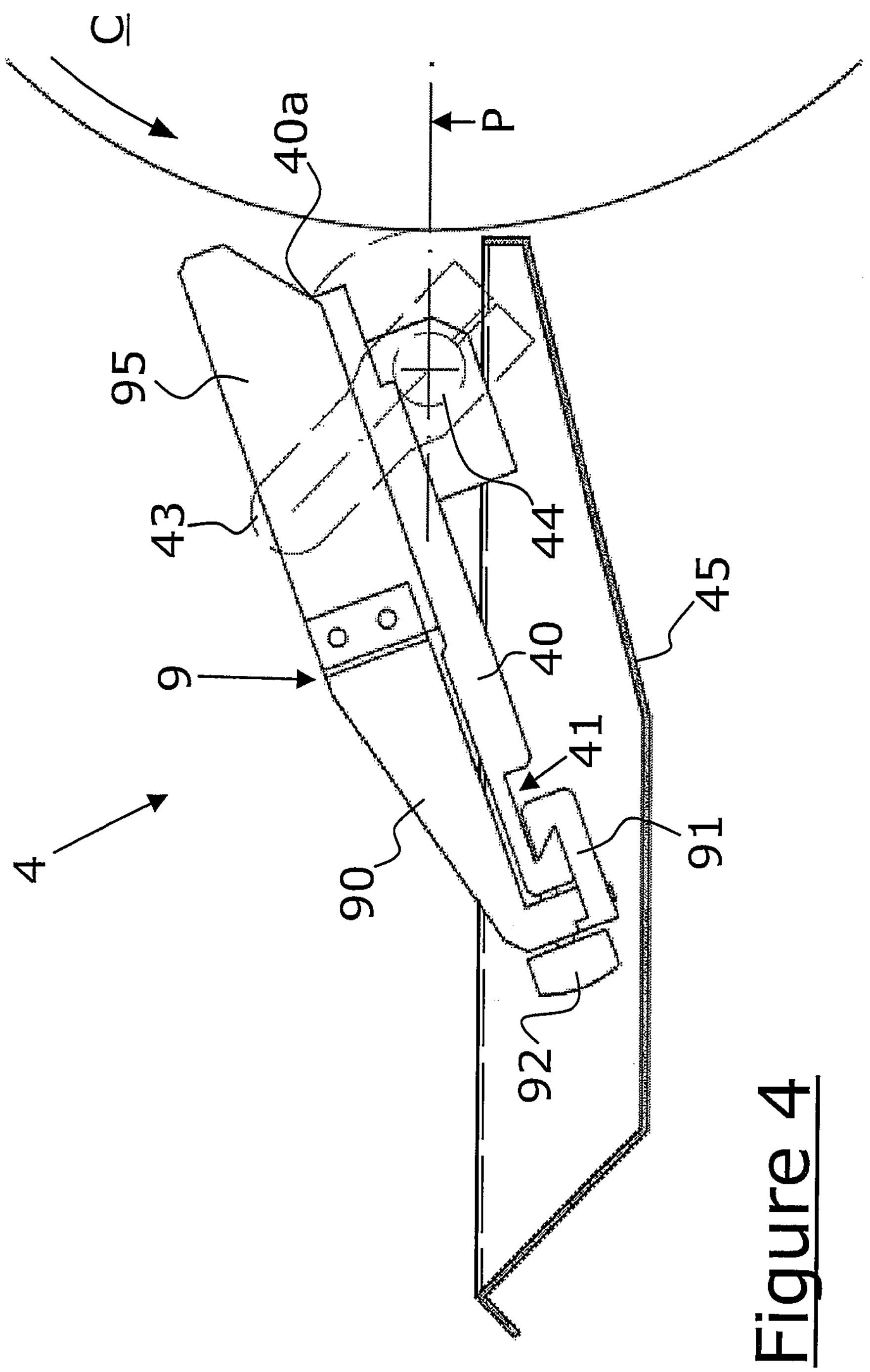
FIG. 4 is a side view of the blade mechanism taken perpendicularly to the axis of rotation of the cylinder to be coated showing the position of the blade mechanism immediately after interruption of the coating process.

The position of the blade 40 following an interruption of the coating process is illustrated in FIG. 4. As mentioned, the blade 40 is rotated counter-clockwise from the position illustrated in FIG. 3, under the action of the actuator 42 (not illustrated in FIG. 4), the rotating arm 43 and the shaft member 44. The resulting position of the blade 40 is the same as that illustrated in FIG. 1, except that the blade mechanism 4 is not yet pulled back to its cleaning position at the front of the machine. In FIG. 4, the trajectory of the straight edge 40*a* of the blade is schematically shown by the dashed arc of circle.

Figure 5:
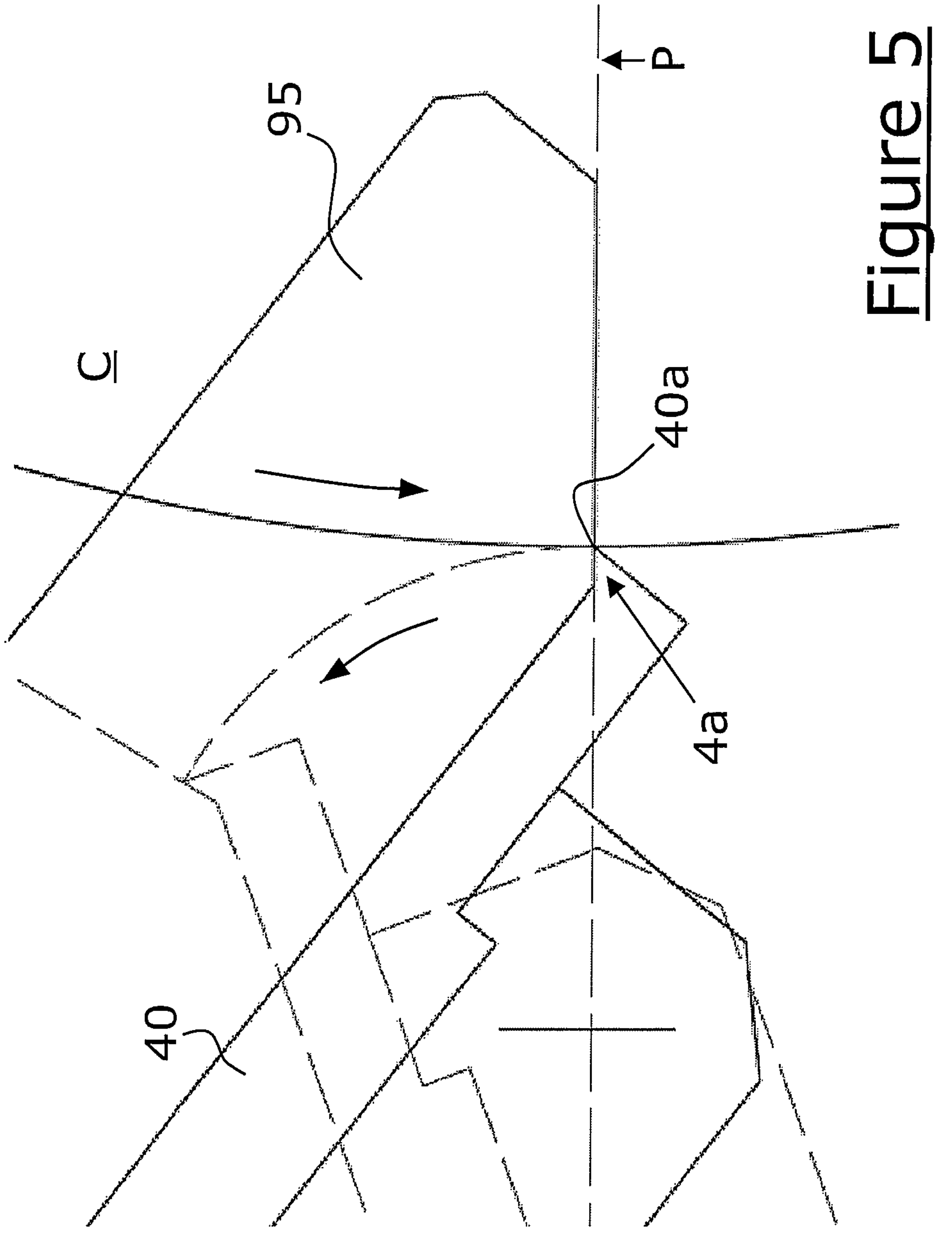
FIG. 5 is an enlarged view of the end profile of the blade forming part of the blade mechanism illustrated in FIGS. 3 and 4.

Preferably, the position of the blade 40 in the coating position is selected in such a manner that the straight edge 40*a* of the blade lies substantially in a horizontal plane passing by the axis of rotation of the cylinder C (which horizontal plane is designated by reference P in FIGS. 3, 4 and 5). In addition, the axis of rotation of the blade 40 (i.e. the axis of rotation defined by the rotating arm 43 and shaft member 44) is preferably located in the same horizontal plane P. In this way, when the blade 40 is rotated backwards, the straight edge 40*a* of the blade 40 undergoes a vertical movement tangential to the periphery of the cylinder C. It has been noticed that this specific configuration is preferable because it ensures a smooth interruption of the coating process and avoids ribbing of the surface of the coated cylinder C. Other configurations might however be envisaged provided one ensures that the trajectory of the straight edge 40*a* of the blade 40, from its coating position to its rest position, is such that it is more or less tangential to the circumference of the cylinder and does not penetrate into the material deposited on the surface of the cylinder. The coating position of the blade 40 could for instance be such that the straight edge 40*a* lies slightly above the horizontal plane P which passes by the axis of rotation of the cylinder C.

FIG. 5 is an enlarged view of the end profile of the blade 40 in the vicinity of the straight edge 40*a*. Rather than being completely planar, the blade 40 comprises, at its terminal end proximate to the cylinder C, an inclined end portion 4*a* having an inverted V-shape rising from the upper side of the blade 40, the top edge of this inclined end portion 4*a* forming the straight edge 40*a* of the blade 40. This inclined end portion 4*a* is only a few millimeters long, but ensures a proper and sharp discontinuation of the supply of plastic material to the surface of the cylinder C at the end of the coating process. Indeed, the inclined end portion 4*a* acts as a sort of cutting member which, when the blade 40 is rotated to its rest position, literally "cuts" into the plastic composition still present at the deposition location, which plastic composition becomes relatively thick and sticky due to the polymerisation process. This specific end profile of the blade 40 ensures that one avoids ribbing of the surface of the cylinder at the end of the coating process, which ribbing would be caused by residual plastic material still present on the blade 40.

Figure 6:
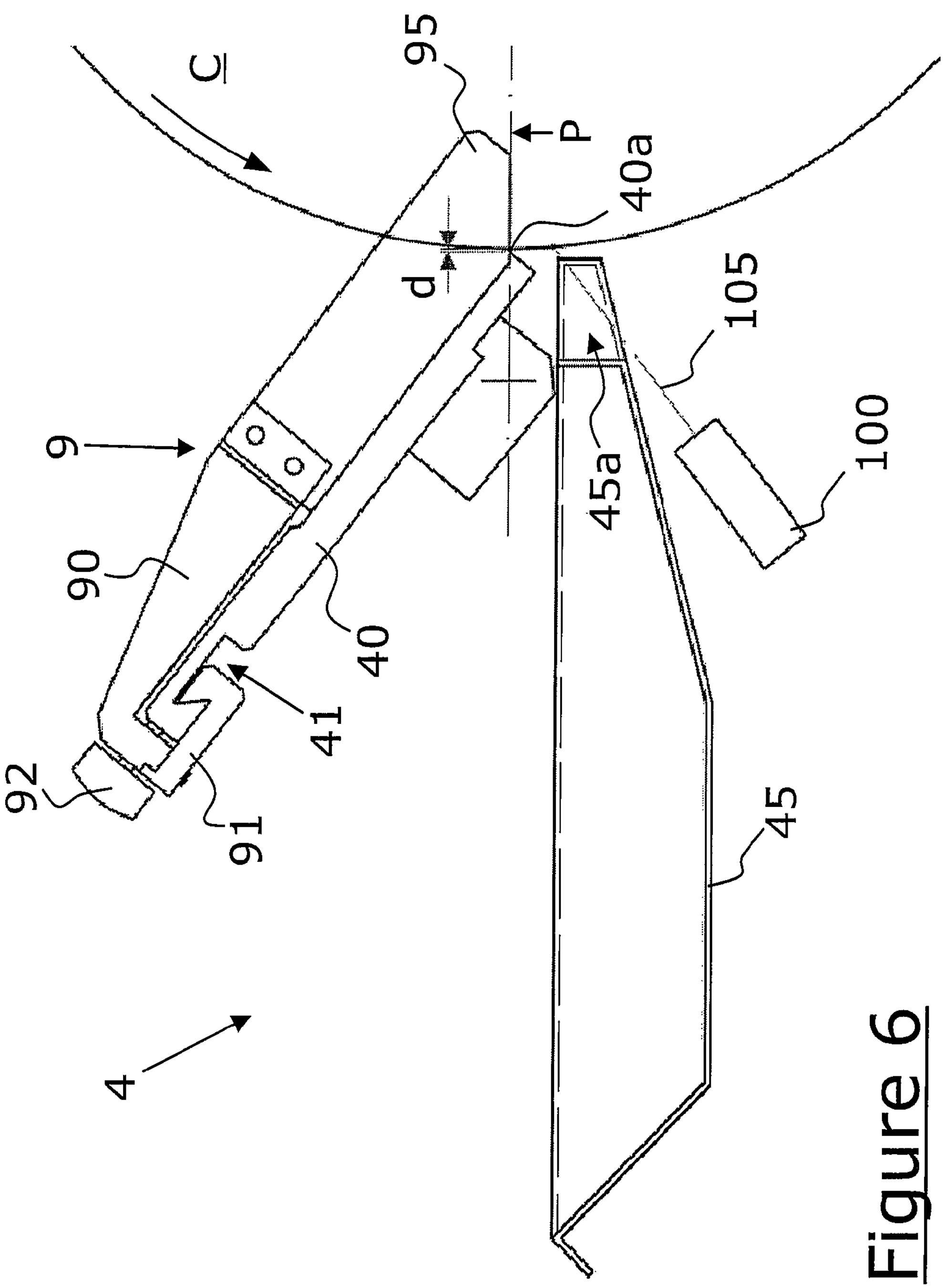
FIG. 6 is a side view of a variant of the blade mechanism of FIG. 3 equipped with an optical distance measurement device.

FIG. 6 is a side view of a variant of the blade mechanism of FIG. 3 equipped with an optical distance measurement device designated by reference numeral 100. The purpose of this optical distance measurement device 100 is to measure and monitor a distance between the blade mechanism 4 and the peripheral surface of the cylinder C being coated. More precisely, device 100 is meant to ensure that a distance d between the peripheral surface of the cylinder C and the strait edge 40*a* of the blade 40 does not fall below a determined threshold distance (for example of 2 mm) in order to prevent the blade 40 from entering into contact with the surface of the cylinder C which could damage both the cylinder C being coated and the blade mechanism 4. It shall be understood that the optical distance measurement device 100 is attached to the blade mechanism 4 so as to follow its translation movement towards and away from the cylinder C. Preferably, the optical distance measurement device 100 is a laser-diode emitting device.

As shown schematically in the example of FIG. 6, the optical distance measurement device 100 is located below the collecting receptacle 45 and produces an optical measurement beam 105 which is directed towards the surface of the cylinder C. In this example, an opening 45*a* is provided at the extremity of the collecting receptacle 45 which is directed towards the cylinder C so as to enable passage of the optical measurement beam 105. The optical distance measurement device 100 could be located in any other adequate position as long as it can provide a measurement of the distance between the blade mechanism 4 and the circumference of the cylinder C being coated.

In operation, when the blade mechanism 4 is brought forward towards the circumference of the cylinder C, the optical distance measurement device 100 continuously monitors the distance between the blade mechanism and the circumference of the cylinder C. If the optical distance measurement device 100 detects that the distance has fallen below the threshold distance d, translation of the blade mechanism 4 is stopped in order to prevent damage, the operator being informed of this status through the provision of an appropriate warning message from the centralized computer interface.

It will be understood that various modifications and/or improvements obvious to the person skilled in the art can be made to the embodiments described hereinabove without departing from the scope of the invention defined by the annexed claims.

The invention claimed is:

1. An apparatus for coating a cylinder, in particular a wiping cylinder of an intaglio printing press, with a plastic composition comprising:

means for horizontally mounting a cylinder for rotation about its axis of rotation;

a blade mechanism disposed on one side of the cylinder including a blade with a straight edge extending along the full length of the cylinder, said blade being disposed, during coating of the cylinder, in a coating position where the straight edge of the blade is oriented towards a peripheral surface of the cylinder and where an upper side of the blade is inclined with respect to the peripheral surface of the cylinder so as to form a reservoir between the upper side of the blade and said peripheral surface for receiving a supply of heat-hardenable plastic composition, said blade mechanism further including means for restraining flow of said plastic composition sideways from said reservoir, said blade mechanism being adapted to move said blade towards and away from the cylinder while maintaining said straight edge parallel to said axis of rotation;

means for translating said blade mechanism towards and away from said cylinder in order to maintain a desired uniform spacing between the straight edge of the blade and the periphery of the cylinder along the full length of the cylinder during coating of said cylinder;

means for rotating the cylinder in a direction to cause its peripheral surface to move downwardly past said blade to thereby apply to said peripheral surface a uniform layer of said plastic composition having a thickness determined by said spacing between the straight edge of the blade and the peripheral surface of the cylinder; and means for applying radiant heat to said cylinder throughout its length as said cylinder is rotated to cause hardening of said applied layer of plastic composition, wherein said blade mechanism comprises a single blade mounted rotatably about an axis parallel to the axis of rotation of the cylinder, the upper side of the blade being planar, said blade comprising, at its terminal end proximate to the cylinder, an inclined end portion having an inverted-V shape rising from and above the upper side of the blade, the top edge of said inclined end portion forming said straight edge of the blade, said blade being adapted to be rotated from the coating position to a rest position in such a way that the straight edge of the blade undergoes an upward movement, upon leaving the coating position, which movement is in an upwardly tangential arc to the peripheral surface of the cylinder in order to discontinue the application of the plastic composition onto the surface of the cylinder.

2. The apparatus according to claim 1, wherein said blade is oriented, during coating of the cylinder, so that said straight edge of the blade lies in a horizontal plane passing through the axis of rotation of the cylinder.

3. The apparatus according to claim 2, wherein the axis of rotation of the blade lies in said horizontal plane.

4. The apparatus according to claim 1, further comprising a collecting receptacle disposed under the blade for collecting waste material from the coating process.

5. The apparatus according to claim 4, wherein the collecting receptacle is adapted to move towards and away from the cylinder together with the blade mechanism.

6. The apparatus according to claim 1, wherein said blade mechanism further comprises means for rotating the blade between the coating position and the rest position, said means including an actuator for actuating a rotating arm coupled to the blade via a shaft member.

7. The apparatus according to claim 1, wherein said means for restraining flow of the plastic composition include a pair of cheek members mounted on the upper side of the blade and each comprising a sidewall member directed perpendicularly to the axis of rotation of the cylinder and contacting each end of the cylinder.

8. The apparatus according to claim 7 wherein said cheek members are mounted on the blade so as to slide along a direction parallel to the axis of rotation of the cylinder and be adapted to the length of the cylinder.

9. The apparatus according to claim 1, further comprising an optical distance measurement device for measuring and monitoring a distance between said blade mechanism and the peripheral surface of said cylinder.

10. Blade mechanism for use in an apparatus for coating a cylinder, in particular a wiping cylinder of an intaglio printing press, with a plastic composition, wherein said blade mechanism comprises a single blade with a straight edge extending along the full length of the cylinder to be coated and which is mounted rotatably about an axis parallel to the axis of rotation of the cylinder to be coated, said blade having a planar upper side and comprising, at its terminal end proximate to the cylinder, an inclined end portion having an inverted-V shape rising from and above the upper side of the blade, the top edge of said inclined end portion forming said straight edge of the blade, and wherein said blade is adapted to be rotated from a coating position to a rest position in such a way that the straight edge of the blade undergoes an upward movement, upon leaving the coating position, which movement is in an upwardly tangential arc to the peripheral surface of the cylinder in order to discontinue the application of the plastic composition onto the surface of the cylinder.

11. The blade mechanism according to claim 10, further comprising means for rotating the blade between the coating position and the rest position, said means including an actuator for actuating a rotating arm coupled to the blade via a shaft member.

* * * * *